Figure 1:
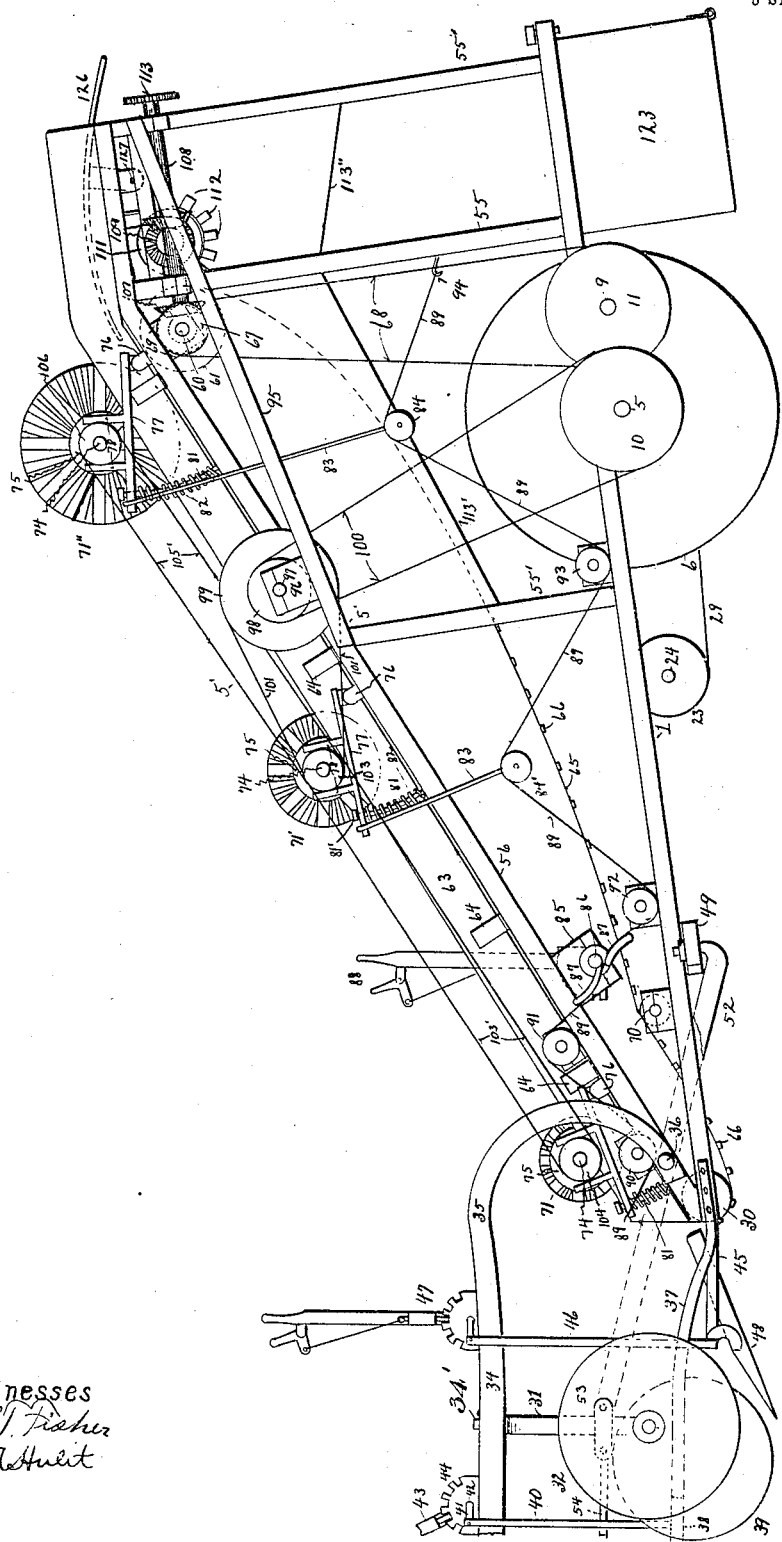

No. 830,362. PATENTED SEPT. 4, 1906.
J. H. PENNICK.
POTATO HARVESTER.
APPLICATION FILED NOV. 23, 1905.

5 SHEETS—SHEET 4.

Witnesses
Inventor
John H. Pennick
By J. A. Rosen
Atty

No. 830,362. PATENTED SEPT. 4, 1906.
J. H. PENNICK.
POTATO HARVESTER.
APPLICATION FILED NOV. 23, 1905.
5 SHEETS—SHEET 5.
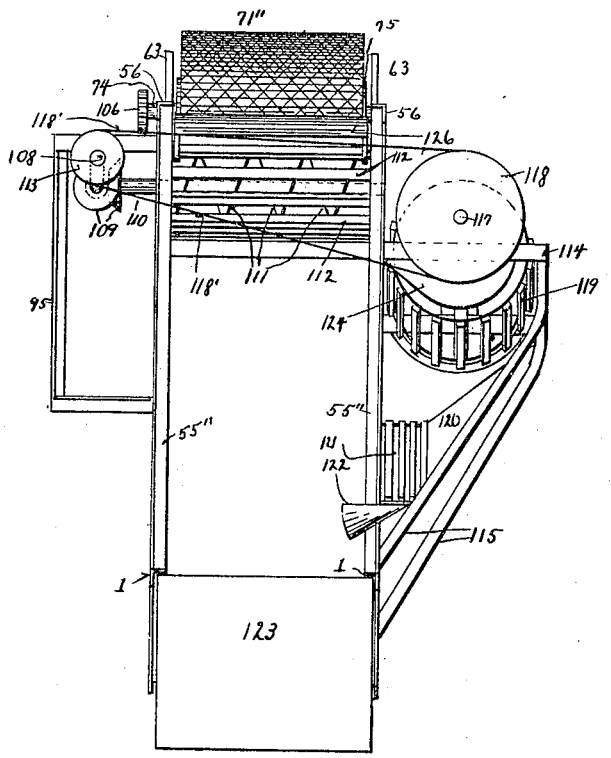
Fig. 7
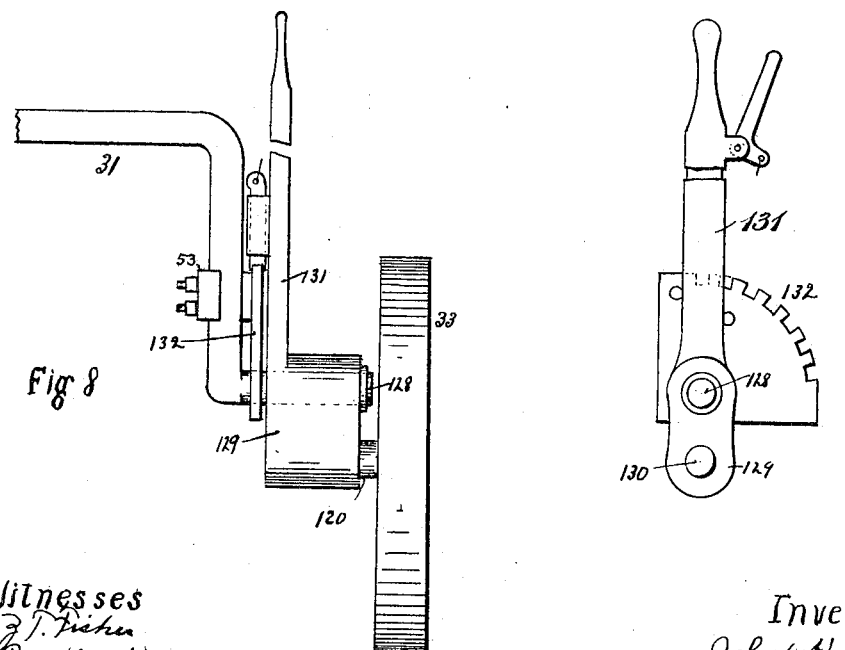
Fig. 8
Fig. 9
Witnesses
Inventor
John H. Pennick
By J. A. Rosen
Atty

UNITED STATES PATENT OFFICE.

JOHN H. PENNICK, OF MENOKEN, KANSAS.

POTATO-HARVESTER.

No. 830,362.  Specification of Letters Patent.  Patented Sept. 4, 1906.

Application filed November 23, 1905. Serial No. 288,682.

*To all whom it may concern:*

Be it known that I, JOHN H. PENNICK, a citizen of the United States, residing at Menoken, in the county of Shawnee and State of Kansas, have invented a new and useful Potato-Harvester, of which the following is a specification.

The object of the invention is to provide a machine complete in itself for harvesting the crop to and including the steps of weighing and sacking the potatoes. In other words, objects are to provide mechanism for the various steps of digging the potatoes, cleaning, and scouring them, sorting them, weighing and sacking them.

The invention consists of the parts, improvements, and combinations herein described and claimed.

In the drawings accompanying and forming part of this specification and in the description thereof I illustrate the invention in its preferred form and show what I deem to be the best mode of applying the principles thereof; but it is to be understood that the invention itself is not confined to the drawings and the description of the drawings, that it may be applied to other uses, such as harvesting beets and other crops, and that parts and combinations thereof as separately claimed may be used in connection with other devices of similar general nature, and that I contemplate changes in form, proportions, materials, arrangement, the transposition of parts, and the substitution of equivalent members without departing from the spirit of the invention.

Figure 2:
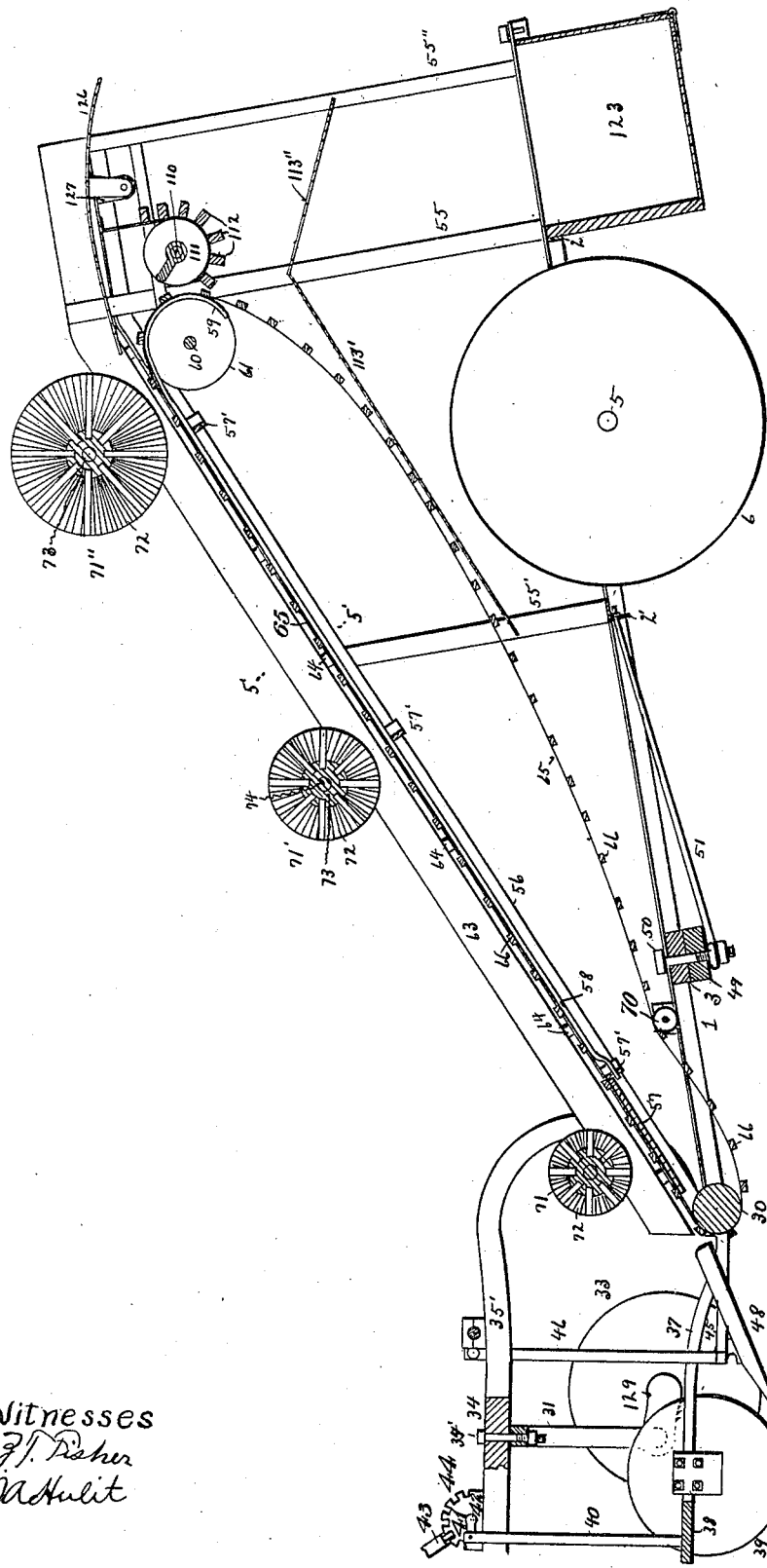
Figure 3:
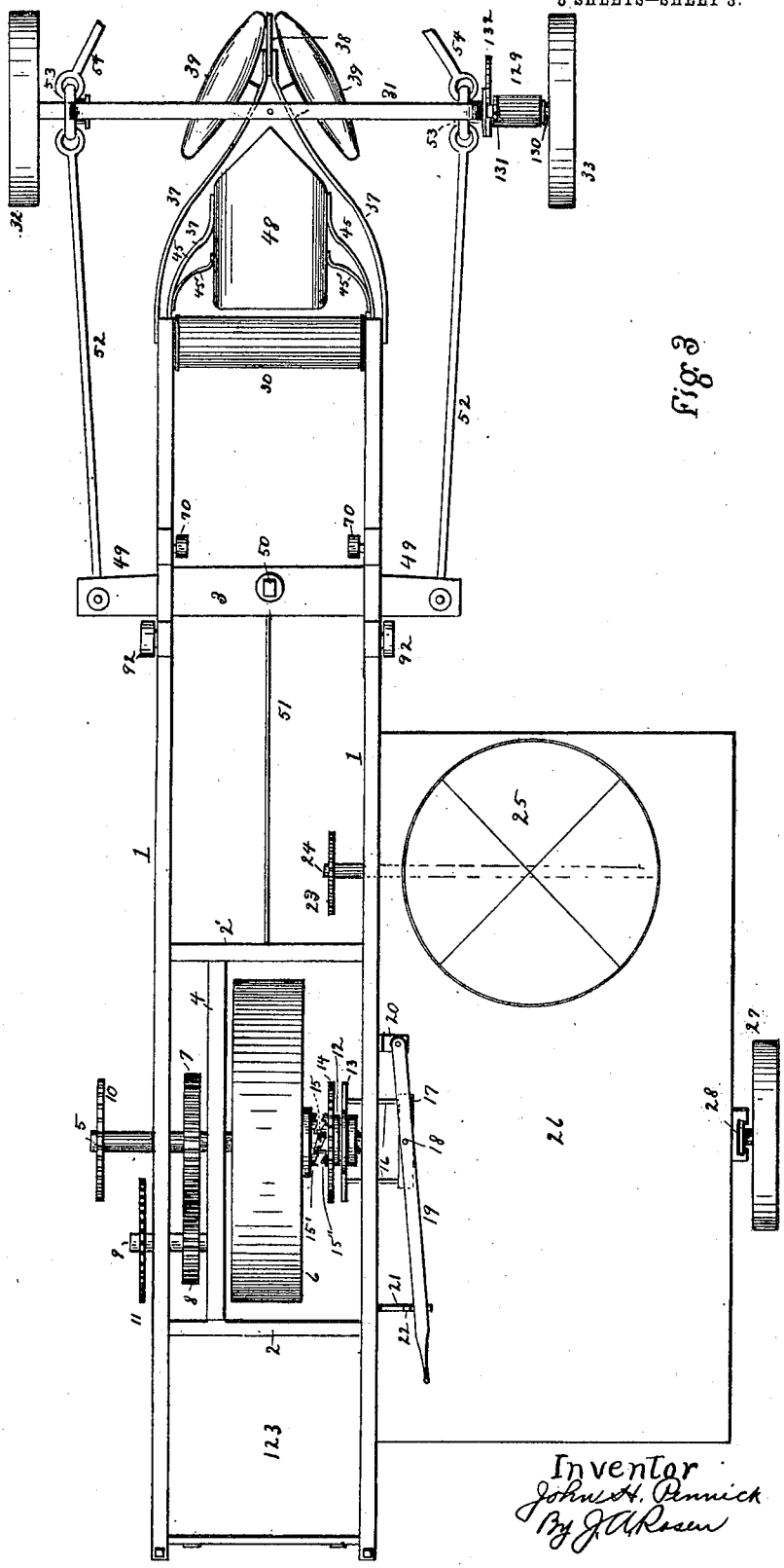
Figure 4:
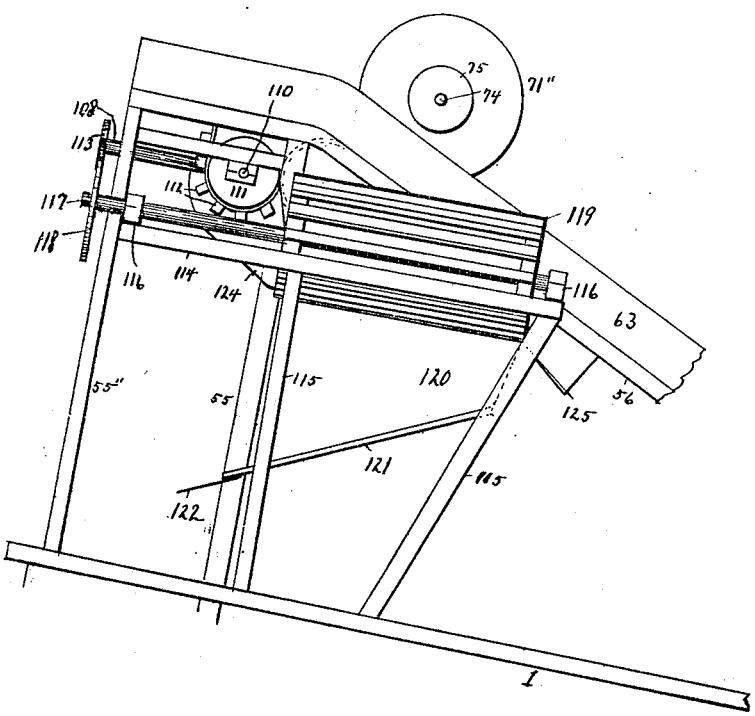
Figures 5, 6:
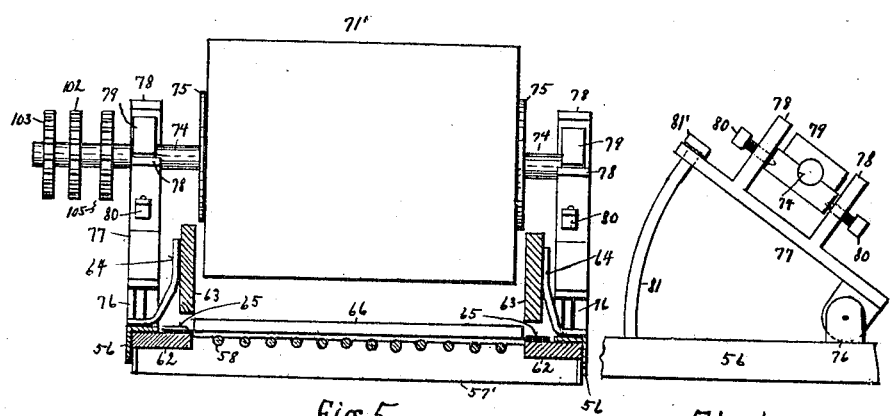

Figure 1 is an elevation view of the left-hand side of the machine. Fig. 2 is a vertical longitudinal section taken approximately on a plane extending through the middle. Fig. 3 is a plan view of the running-gear and the lower portions of the machine. Fig. 4 is an elevation view of the rear portion of the right-hand side of the machine designed especially to show the sorter apparatus. Fig. 5 is an enlarged sectional view of the elevator and brush, showing the details thereof, and is taken approximately through the line 5' 5' of Figs. 1 and 2. Fig. 6 is a side view of the adjustable bearing for the brush-shaft. Fig. 7 is a rear elevation intended especially to show the sorter. Figs. 8 and 9 are enlarged detail views of the right-hand wheel of the forward truck, which is adapted to be raised or lowered to adapt it to retain the gearing about level, whether it run in a plowed furrow or on the smoother surface.

Like reference-numerals indicate like or corresponding parts throughout the several views.

Preferably the frame is constructed of angle-iron.

1 1 are the stringers, adapted to sustain the main weight of the machine. They are connected by suitable cross-pieces, as by the angle-irons 2 2' and by the two-inch timber 3. Another piece 4 connects cross-pieces 2 and 2', and underneath the pieces 1 1 and 4, in suitable bearings, extends the main shaft 5, on which is loosely mounted the main traction or "bull" wheel 6. It will be understood that the principal weight of the rear portion of the machine is carried by this wheel and shaft, which must be built accordingly, and this wheel and shaft in turn provides the motive power for the elevator, brushes, sorter, &c. Keyed to shaft 5 is the gear 7, which meshes with a gear 8 on shaft 9. On shafts 5 and 9 are the sprockets 10 and 11, respectively, for operating the various parts, as will be presently explained. The grooved collar 12 and the sprocket 14 are an integral piece 15, keyed loosely onto shaft 5, so as to constantly revolve when said shaft revolves and to carry the shaft with it; but said collar and sprocket are movable longitudinally on the shaft. A collar 13 is fitted into the groove of collar 12 and is connected by rods 16 to a cross-head 17, which is pivoted at 18 to a lever 19, pivoted to a bracket 20 and adapted to set on either side of a lug 22 on a bracket 21. Secured to the main wheel 6 is one member 15' of an ordinary clutch, while the other member 15" is secured to the collar and sprocket. In Fig. 3 the machinery is out of gear, permitting the bull-wheel to rotate loosely on the shaft 5; but upon shifting lever 19 to the other side of lug 22 the two members of the clutch will engage each other, thereby turning shaft 5, and with it operating the machinery hereinafter described. Sprocket 12 is connected by a sprocket-chain 29 with sprocket 23 on shaft 24, whereby is operated an automatic weigher and sacker, which I have graphically described as 25, but which is the subject-matter of another application now being prepared and about to be executed and filed by me, to which other application reference is hereby made for the details of such weigher and sacker. A platform 26 is secured to and arranged along the side of the machine for supporting the weighing and sacking machinery and on which an attendant may stand, and the outer side of the platform may be provided with a traction-wheel 27, which may be mounted adjustably, 28, to maintain the platform at a proper level whether the wheel run in a furrow or on the unplowed ground.

At the forward end of the frame between the stringers 1 1 is mounted a roller 30, around which the elevating chains and slats pass. On an axle 31 are set the two wheels 32 and 33, the latter being adjustably mounted, as will be detailed hereinafter. The beam 34 is pivoted to the axle 31 by a kingbolt 34', Figs. 1 and 2, and is divided and extended in the form of two goosenecks 35 35', which are pivoted to the opposite sides of the elevator-frame at 36. Secured to and extended forwardly from the said frame are the rods 37 37, which come together at 38 and to each of which is secured a disk 39. A rod 40 connects these rods with the crank-arm 41 of shaft 42, which is operated by ratchet-lever 43, which engages with the rack 44 to lower or elevate the forward end, especially the disks. Another pair of rods 45, similarly secured and extended, support the shovel 48, auxiliary braces 45' 45' being also provided to hold the shovel rigid. Shovel and rods are supported by rods 46 46, connected to crank-arm on a shaft controlled by ratchet-lever 47 in a manner similar to the device used for the rod 40, for raising and lowering the disks.

A beam 49 is pivoted by king-bolt 50 to the cross-piece 3, and the lower end of the bolt is held rigid by a brace-rod 51. The outer ends of the beam 49 are connected by rods 52 52 with brackets 53 53 on the two legs, respectively, of the axle, which are connected in turn with the rods 54 54, to which the motive power of the machine as a whole is secured. The machine as herein designed may be drawn by four horses.

Special attention is called to the function and arrangement of the disks and shovel. It will be noted that the disks are located just in front of the shovel and that they are mounted so that they slant inwardly from the bottom up and outwardly from the front back. The purpose of this relative arrangement is that the disks will throw the soil away from each side of the row of potatoes, and thus leave the smallest possible amount of soil to be dug up by the shovel with the potatoes. This greatly aids in the subsequent cleaning and scouring. The ridge which is passed between the two disks contains the potatoes and is dug up by the pointed shovel and passed onto the lower and forward end of the elevator now to be described.

To a number of suitable uprights, as 55 55' 55'', are secured the pieces 56 56, which support the elevator-runway and other mechanism now to be described. These pieces may be connected by suitable cross-pieces, as by the board 57 at the lower end and the bars 57' 57', arranged at intervals along the length of the runway. The bottom of the runway is made up of a number of round iron rods 58 58, terminating at their upper ends in rounding rods 59, connecting to the sprockets 61, whereby the elevator-chains are driven. These rods are arranged close enough together to prevent the potatoes from falling through, but permit the dirt to pass through and onto the ground again. Fastened to each piece 56 is a board 62, while the guards or sides of the runway 63 63 may be held in place by the brackets or braces 64 64. The sprocket-chains 65 65 pass along the surface of the boards 62 and under the guards 63 63, and secured to the chains are the slats 66 66, arranged at intervals of about four inches apart around the endless chains 65 65 and which of course serve to carry the soil and potatoes, the product of the shovel, up through the elevator-chute in the usual manner of such devices. This arrangement permits of no loss, except through the rods which form the bottom of the chute. The two chains are driven by the two sprockets 61 61, mounted on the shaft 60, on which is sprocket 67, which is driven by a chain 68 from sprocket 11. Shaft 60 may be mounted in any suitable manner, as in blocks 69. A pair of rollers 70 70 serve to guide the carrier over the beams 3 49.

Arranged at intervals along the elevator are a number of rotary brushes, here represented as three in number, 71, 71', and 71''. These brushes and the manner of mounting them are alike, except that the brushes are of different sizes preferably, each being made up about as follows: In a core or any suitable stock are inserted the bristle portion 72, (made of split cane,) and the core is secured to the shaft 74. At each end of the core is an end piece or shield 75. To a bracket 76 on the side strip 56 is pivoted the bracket 77, provided with the two standards 78 78, which support between them the journal-bearings 79 for the brush-shaft 74. Each boxing may preferably be supported on the set-screws 80 80, which permit the boxing to accommodate itself to the angle of the shaft, thus preventing breakage because of uneven disposition of the shaft which will result from unequal pressure on the product in the elevator-chute. A rod 81 is fastened to the side piece 56 and extends up through the bracket 77 and is provided with a tap or nut 81'. A compression-spring 82 normally holds the bracket 77 against nut 81'. From the brackets 77 for the brushes 71' and 71'' are suspended the rods 83 83, provided with rollers 84' 84, respectively. Extending through suitable boxing 85 is a shaft 86, to one end of which is secured a suitable ratchet-lever 88 for its control and to the other end of which is secured the reversible brake-shoe 87. A suitable connecting medium, such as a sprocket-chain, is secured at one end to the bracket 77 of the brush 71, thence passes under roller 90, thence around roller 91, thence through the brake-shoe 87, thence under roller 92, thence over roller 84', thence under roller 93, thence over roller 84, thence to the hook 94 on upright 55.

An angle-iron 95 is secured to the side of the frame and extended outwardly therefrom to form a bracket to sustain some of the parts to be described. A boxing 96 is secured thereto, in which is mounted one end of a short shaft 97, on which are keyed the sprockets 98 99, the former being connected by a sprocket-chain 100 with the sprocket 10 on the main shaft 5 and the latter being connected by a sprocket 101 with the sprocket 102 on the brush-shaft 74 of the middle brush 71', on which shaft are also secured the sprockets 103 and 105, the former being connected by chain 103' with sprocket 104 of brush 71 and the latter being connected by sprocket-chain 105' with sprocket 106 of the uppermost brush 71''.

It will be noted that the brushes are graduated in size, the first one being the smaller in diameter and the last one, 71'', being the largest in diameter, and it will also be noted that they are graduated in their closeness to the slats and bottom of the elevator, the first or smaller one being farthest away and the last and largest one being closest. The purpose and operation of this arrangement of elevator and brushes are as follows: The soil, with the potatoes, is passed from the shovel 48 onto the bottom of the elevator-chute, and from there it is carried to the other end by the slats in the carrier. As the soil is first passed under the brush 71 it is disintegrated thereby and considerably broken up, and this process is repeated to a greater extent in passing under the second brush and still further in passing under the third brush. All along the chute, too, the finer particles of earth are permitted to pass through the openings in the bottom of the chute, and the potatoes themselves settle to the bottom and are carried along by the slats, being cleaned and scoured by the operation. Usually quite a lot of brush will be dug up with the soil and passed along up the elevator, and to get this out, as well as to further take out the dirt, I find good results in the use of a tail-board 126, which may be pivoted to brackets 127, the forward end of the tail-board being brought close to the slats and under the upper brush 71''. The brush, I find, will throw the brush and most of the dirt over the tail-board, while the potatoes, which are now quite well cleaned and smooth, will pass over the rounding ends 59 of the rods and between the slats of the carrier. The forward end of the tailboard may be adjusted so as to barely allow of the passage of the potatoes under it, the adjustment depending on the size of the potatoes quite largely, also upon the throw of the large brush.

By a pair of bevel-gears 107 motion is transmitted from the elevator drive-shaft 60 to the shaft 108, and by another pair of bevel-gears 109 motion is transmitted from shaft 108 to the screw conveyer-shaft 110, on which is mounted the screw 111, which rotates in a trough made up of the slats 112 112, which are spaced apart, so as to permit the dirt, but not the potatoes, to sift therethrough onto the apron 113'', whence it may be discharged out onto the ground. This trough and conveyer are located immediately alongside of the upper end of the elevator-chute, so that the product therefrom passing under the tail-board is discharged thereinto. The operation of the screw conveys the potatoes along the trough toward the right and further disintegrates whatever dirt may accompany them and forcing it through the slats. On the right-hand side of the machine is another angle-iron 114, which forms a supporting-bracket in connection with braces 115 115 for a shaft 117, journaled in boxings 116 116 and provided at its rear end with a large sprocket 118, which is operated by a sprocket-chain 118' from the sprocket 113 on shaft 108. On the shaft 117 is the cylindrical sorter 119, made up in simple form of the slats suitably spaced apart, so as to permit the smaller potatoes and the dirt to fall therebetween and carrying the larger potatoes along to the lower end, whence they are discharged through the chute 125 into the sacks in the automatic weigher and sacker hertofore referred to. Preferably I space these slats about an inch and a half apart, although here, as well as elsewhere, the spaces may be varied to suit any circumstance. The product which passes through the slats passes down the chute 120, the bottom of which is narrowly slatted, as at 121, so as to permit the dirt to sift therethrough, and the lower end of which is provided with a lip 122, over which the small potatoes are discharged into a box 123 at the rear of the machine. These various means of disintegrating and agitating the earth and scouring the potatoes and providing for the escape of the dirt and refuse without at the same time injuring the potatoes from the time the soil is delivered into the elevator to the time the potatoes are delivered into the sacks have the result of thoroughly cleaning the potatoes and producing in the sacks a thoroughly-cleaned and marketable (as to size) product. A shield 113' protects the clutch and gearing associated with the bull-wheel from the dirt falling through the upper portion of the elevator-shaft.

Referring now to the adjustable mounting for the right-hand wheel 33 of the forward truck, the spindle 128 of the axle carries a block 129, which has a spindle 130, on which the wheel 33 is mounted. A ratchet or rack 132 is secured to the upright portion of the axle, and a ratchet-lever 131, fastened to or integral with the block 129, engages the rack, whereby the wheel may be raised or lowered relatively to the axle 31 by the manipulation of the ratchet-lever. In going to the field and in digging the first furrows this wheel will have the position shown in Fig. 2; but after this wheel passes into the plowed furrow it would be set deeper accordingly, as indicated in Figs. 8 and 9.

Having thus described my invention, what I claim as new is—

1. The combination in a machine of the kind described, of a digging-tool, a frame and running-gears, an elevator-chute, a carrier therein, a series of brushes arranged along the chute for disintegrating the earth and scouring the potatoes, said brushes being graduated in size as to diameter.

2. The combination of a frame, running-gear, a digging-tool, an elevator-chute, a carrier therein, and a series of rotary brushes arranged along the chute for disintegrating the earth and scouring the potatoes, said brushes being graduated in closeness to the chute-bottom.

3. The combination of a frame, running-gear, a digging-tool, an elevator-chute, a carrier therein, and a series of graduated brushes arranged along the chute for disintegrating the earth and scouring the potatoes.

4. The combination in a machine of the kind described of a frame and running-gear, a digging-tool, a series of rotary brushes arranged along an elevator-chute, an elevator-chute and a carrier therein, and a tail-board 126 behind the last brush and above the carrier to eliminate the lighter products from the heavier, as set forth.

5. The combination in a machine of the kind described, of a frame and running-gear, a digging-tool, an elevator-chute and a carrier therein, rotary brushes arranged along the chute and coöperating with the carrier as described, bearings for the brush-shafts, and means for raising and lowering said brushes with relation to the carrier.

6. The combination of an elevator-chute and a carrier therein, a series of rotary brushes arranged along the chute, adjustably-supported bearings for the brush-shafts, and means for raising and lowering all said brushes simultaneously.

7. The combination in a machine of the kind described, of an elevator-chute and a carrier therein, rotary brushes arranged along the chute, spring-supported bearings for the brush-shafts, and means common to all such bearings for raising and lowering same with relation to the bottom of the chute.

8. The combination in a machine of the kind described, of an elevator-chute and a carrier therein, rotary brushes arranged along the chute, pivoted spring-supported bearings for the brush-shafts, means common to all the bearings for raising and lowering same, and a brake-shoe and ratchet-lever for controlling and operating said means.

9. In a machine of the kind described, the combination of a frame, a forward truck, a main traction or "bull" wheel disposed approximately centrally of the elevator and at the rear, an elevator-chute and a carrier therein, a series of brushes coöperating with the carrier, a sorter, power-transmission apparatus between the "bull-wheel" and the carrier, brushes, and sorter, and a platform arranged at one side of the main frame with a running-gear.

10. In a machine of the kind described, the combination of a frame, a forward truck, a digging-tool, an elevator-chute and a carrier therein, a series of rotary brushes arranged along the chute and coöperating with the carrier upon the product passing along the chute, a main traction-wheel at the rear and adapted to trail in the path of the digging-tool, a platform and traction-wheel at one side of the main frame, and power-transmission apparatus between the main traction-wheel and the carrier and brushes.

11. The combination in a machine of the kind described with a frame and running-gear, of a digging-tool, a chute having openings in the bottom to permit the smaller particles of dirt to sift therethrough, a slatted endless conveyer adapted to rest on the chute-bottom and to convey the product over the surface of the chute-bottom, a series of graduated rotary brushes arranged along the chute and coöperating with the conveyer to disintegrate the earth and scour the potatoes.

12. The combination in a machine of the kind described with a frame and running-gear, of a digging-tool, an elevator-chute having openings in the bottom to permit the smaller particles of earth to sift therethrough, a slatted endless conveyer adapted to rest upon the chute-bottom and to convey the product over the surface thereof, a series of graduated brushes arranged along the chute, and means for raising and lowering the brushes with relation to the conveyer.

In testimony whereof I have signed my name to this specification in the presence of witnesses.

JOHN H. PENNICK.

Witnesses:
JOHN A. HULIT,
Z. T. FISHER.